Oct. 28, 1924.
A. E. BELL
COURSE INDICATOR
Filed April 18, 1921
1,513,026
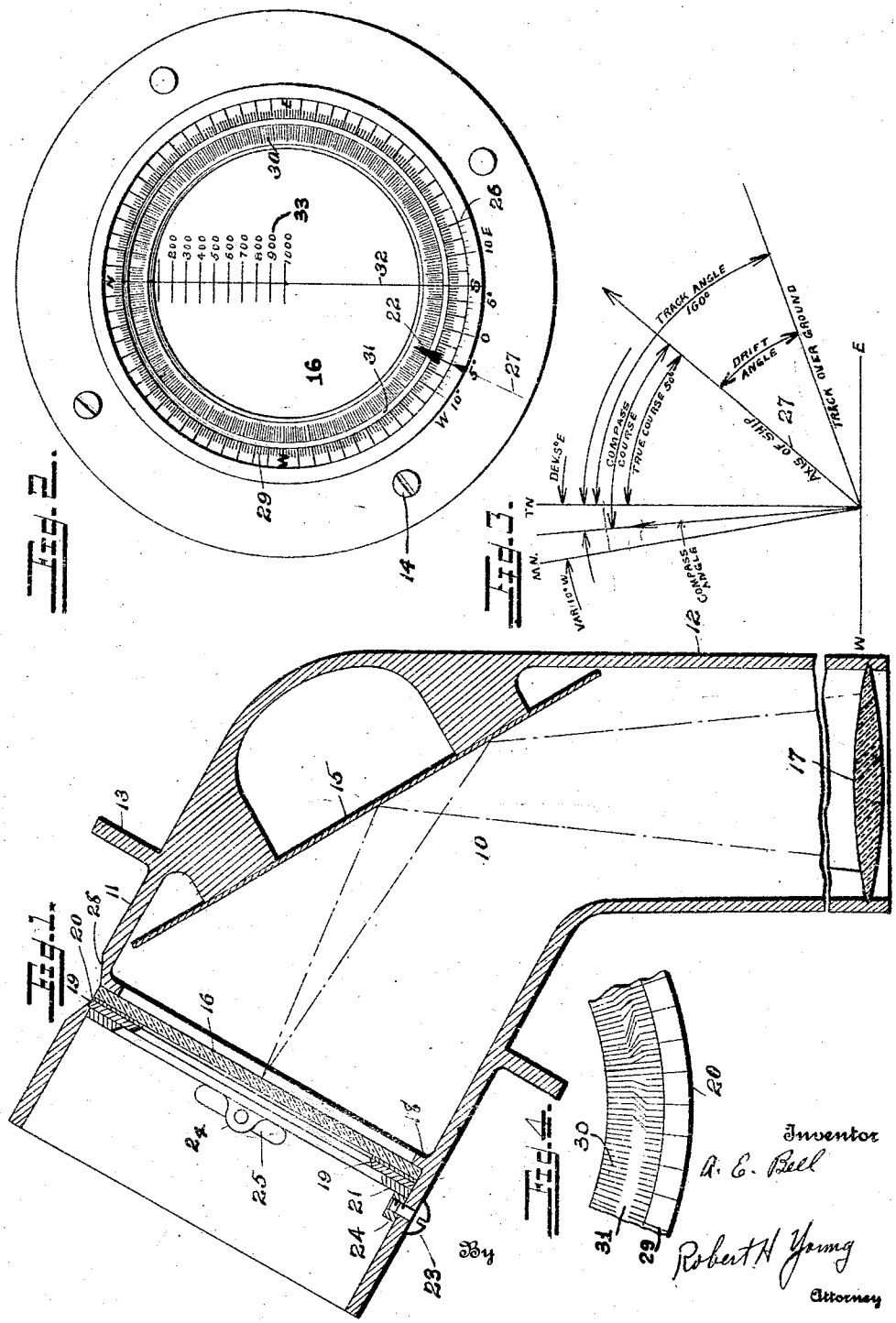
Inventor
A. E. Bell
By Robert H. Young
Attorney Patented Oct. 28, 1924.

1,513,026

UNITED STATES PATENT OFFICE.

ALONZO E. BELL, OF SPOKANE, WASHINGTON.

COURSE INDICATOR.

Application filed April 18, 1921. Serial No. 462,242.

*To all whom it may concern:*

Be it known that I, ALONZO E. BELL, a citizen of the United States, residing at Spokane, in the county of Spokane and State of Washington, have invented certain new and useful Improvements in Course Indicators, of which the following is a specification.

My invention relates to a course indicator for use in the navigation of airplanes, balloons, and other aircraft.

In flying from one geographical location to another over a predetermined route, the pilot of an aircraft has several difficulties with which to contend in trying to adhere to a true course. In the first place, there is the wind to be taken into consideration. For instance, if a pilot starts out on his flight with the intention of flying due east and heads his ship toward true east, he will actually fly due east at varying speeds, depending on his air speed and the direction and velocity of the wind, provided that he has a direct head or tail wind. However, if the wind blows from any point of the compass other than true east or west, he will be drifted off his desired course by an amount depending again upon his air speed, and the wind velocity and direction.

This difficulty calls for the provision of some means for determining the drift angle, so that the pilot may alter his compass course to bring his ship over the desired course.

Another factor to be reckoned with is magnetic variation of the compass needle due to the fact that the magnetic pole of the earth does not coincide with the true North Pole. This variation will differ, also, in degree and direction depending upon the geographical position of the ship.

A third difficulty is presented by deviation of the compass needle due to the presence of steel and soft iron in the structure of the ship. The steel, having the property of retaining its magnetism, is of constant polarity and therefore exerts a constant force on the compass needle for any position into which the ship may be swung. The iron, however, depending for its magnetism and polarity on its position with relation to the direction of the magnetic lines of force in the earth, exerts a varying effect on the compass needle for practically every position of the ship with relation to true north. Furthermore, this deviation of the needle differs not only in degree but also in direction, so that perhaps, when the ship is headed toward true west, the needle may have a deviation of 5° west; whereas, when pointed toward true south, it may give the needle a deviation of 2° east.

Therefore, it will be seen that there are these three factors for a pilot to consider when in the air and flying a definite course, and it is exceedingly difficult while flying for a pilot to remember whether to add or subtract his drift, variation or deviation to or from his compass course in order to determine his true track over the ground with reference to true north; furthermore, every time the wind changes in direction or velocity the compass course must be altered to change the direction of the axis of the ship with reference to the wind in order to maintain the original course, and, each time the compass course is changed, track angle, magnetic variation and deviation must be taken into account.

It is owing to the difficulty of keeping these things straight while their attention is focused on other things that many pilots disregard their compasses and fly by landmarks, and it is through a desire to obviate this apparent necessity that I have devised my course indicator.

The primary object of the invention is, therefore, to provide for use by air pilots in long flights a course indicator to which a pilot may refer readily from time to time and obtain, as a direct reading, the mean alteration in his course necessary to correct for drift and magnetic variation and deviation. The pilot simply makes a speedy ground observation through a periscope, which forms part of the instrument, and at the same time adjusts certain parts of the instrument manually. This occupies only a very few seconds of time and a direct reading is obtained without any mathematical computations whatever.

A further object is to incorporate in a course indicator of this character additional means for determining the ground speed of the ship at a glance, also as a direct reading.

Another object is to produce a course indicator, or combined course and ground-speed indicator, which will take the form of a compact instrument of small size adapted to be mounted on the usual instrument board of an aircraft.

A still further object is to provide an instrument of this nature which will be extremely simple and durable in construction and composed of very few parts, thereby reducing the cost of manufacture and insuring reliability of operation.

It is my object also to produce an instrument which will withstand the vibration and stress of use in an aircraft. When mounted on the instrument board of an airplane, for instance, it will not be affected by the motion of banking, diving, or stunting.

Other objects and advantages should become apparent as the following specific discription is read in connection with the accompanying drawings, in which:

Figure 1 is a vertical section through the instrument;

Figure 2 is a plan view of the dial, showing the same set for a given problem in course determination; and Figure 3 is a graphic representation of the factors involved in the same problem.

Figure 4 is a plan view of a portion of the scale-bearing ring, as commercially produced for use in the course indicator, showing the corrections for magnetic deviation only partially completed.

While it may be found more practicable to manufacture my course indicator in other forms and types; one convenient form which it may take is illustrated in the drawings.

Referring particularly to Figures 1 and 2, the numeral 10 designates the instrument casing, which is tubular in construction and is bent to provide two angularly disposed branches 11 and 12. The tube is adapted to be positioned in use with the branch 11 uppermost and attached to the instrument board of the aircraft. Any suitable attaching means may be employed, such as the flange 13 and screws 14. When in position on the board, the upper branch 11 is in view of the pilot, and the lower branch 12 points downward in the direction of earth when the ship is level.

In order that objects on the ground may be viewed through the casing by the pilot, means are provided to convert the same into a combined periscope and telescope. For this purpose a suitably disposed reflector 15 is mounted in the casing at the bend therein. The manner in which the ground objects are viewed is preferably by observation of images cast on a ground glass plate 16 in the upper branch of the casing. An objective lens 17 in the lower branch projects light rays on the reflector, which in turn projects upright images on the ground glass plate. Accordingly, when the ship is flying, images of ground objects will move in procession across the ground glass plate in a direction corresponding to the track of the ship over the ground and at a speed depending upon the altitude and ground speed of the ship. The images follow what may be termed "stream lines."

The ground glass plate 16 is rotatably mounted in the upper casing branch and bears against the inwardly projecting backing flange 18. A flat, transparent ring 19 is rotatably mounted in front of the plate 16 and has a scale-bearing ring 20 of paper or other suitable material glued or otherwise secured to its rear face. The scale-bearing ring is thus interposed between plate 16 and ring 19, but is supported by the latter and rotates therewith. On the outer face of ring 20 a scale, which will be described more fully hereinafter, is delineated and is visible through the transparent ring 19. Rings 19 and 20 constitute a rotatable unit which may be termed a rotary, or adjustable, scale member.

Mounted in front of this scale is another transparent ring 21, which bears against ring 19 but is capable of limited independent rotary adjustment. Ring 21 serves two purposes. It bears a radial lubber line 22 visible from the front, and likewise acts as a retaining member for the rotary plate 16 and scale member. The ring 21 may be secured releasably in adjusted position by some suitable means, such as the screws 23 which are threaded into lugs 24 on the ring and are slidably mounted within annular slots 25 in the casing. In order that the degree of angular adjustment of ring 21 may be determined with precision, a scale of measurement 26, expressed in degrees of the compass, may be provided on the casing in registration with the lubber line of the ring. The zero line of this scale should coincide with the "X" axis 27 of the ship, which is parallel to the longitudinal axis of the ship.

The lubber line may be shifted with respect to the "X" axis of the ship by turning the ring 21, which is accomplished by manipulation of the protruding heads of screws 23 as handles. The ring may be secured in the desired position by rotating the screws. A screw driver, or other equivalent device, (not shown) may be used for this purpose.

Any convenient means may be provided for rotating the ring 19 and plate 16 independently. A simple way of accomplishing this is to provide a wide V-slot 28 in the casing at such a location that the edges of the ring and plate will project into the same and be exposed for contact with the pilot's fingers. The edges of the ring and plate may be roughened, if necessary, to give purchase in the manipulation of these members.

The extremity of branch 11 of the casing projects past ring 21 to an extent sufficient to afford a light shade.

The ring 20, or deviation card, as it may be termed, bears a scale on its front face which is divided into two concentric scale sections 29 and 30. The scale section 29 is situated nearer the periphery of the ring than section 30 and is separated from the latter by an annular, blank space 31. The outer section 29 is graduated in degrees of angular measurement the same as the usual air compass. The inner section 30 has graduations registering with those of section 29 across the blank space 31, but there are no indicia on section 30. Rings of this character may be printed in quantities for use in course indicators. In Figure 4, a fragment of one of these rings is shown. The right side of this fragment has been corrected for magnetic deviation, whereas the left side is in its original condition.

Each course indicator has a deviation card prepared especially for the particular ship on which it is to be used. This is done by swinging the ship in azimuth through three hundred and sixty degrees, starting at true north. The ship may be swung five degrees at a time and the deviation of the air compass reading from the true reading, due to the presence of steel and iron in the ship, may be indicated on the deviation card by drawing a diagonal line from the graduation on scale section 29 corresponding to the air compass reading across the space 31 to that graduation on scale section 30 which is offset from the said graduation of scale section 29 to the extent and in the direction that the air compass needle deviates from the true reading for that precise position of the ship. Deviation for intermediate degrees may be interpolated with sufficient accuracy. Each graduation on the inner scale section 30 of a completely corrected card thus corresponds to a particular graduation on the outer scale section 29 and is connected to it by a line which can be readily followed with the eye.

Ground glass plate 16 bears a diametrical line 32, which will be termed the direction indicating or drift line. The extremities of this line traverse the scale of the deviation card when either the plate 16 or the ring supporting the deviation card is turned on its axis of rotation. Although the drift line actually registers with graduations of the inner scale section 30 only, any one of those graduations which happens to be in registration with the drift line serves as a prolongation of the latter and approaches so close to the aligned graduation of scale section 29 that the drift line visually register with the said graduation of section 29. The lubber line 22 also is adapted to register with the graduations of scale section 29 of the deviation card.

It is obvious, however, that some alternative, equivalent arrangement of scale sections and registering lines may be employed instead of that disclosed herein.

The operation of the instrument as a course indicator will now be described. Let it be assumed that the pilot has taken off without previous knowledge of the wind velocity or direction, but knows the bearing of his destination from the starting point with reference to true north, that is, his true azimuth course. It is to be assumed also that he has rotated ring 21 in the instrument casing so as to bring the lubber line 22 to the right or left of the stationary line 27 representing the "X" axis of the ship, and offset therefrom to a degree equal to the magnetic variation of the compass in that section of the country, the ring being secured rigidly in set position by means of the screws 23.

The pilot heads out in the general direction in which he wishes to fly, but soon finds that the wind is blowing him off his course. Glancing at the indicator dial, he rotates ground glass plate 16 until the stream lines of images of ground objects are in apparent parallelism with the drift line 32. He next rotates ring 19 bearing the deviation card until the graduation line of scale section 30 corresponding to, and connected by a diagonal line to that line on scale section 29 which represents the observed compass reading, coincides with lubber line 22. Then, the line on scale section 29 with which the drift line 32 registers gives a direct reading of the actual course of the ship over the ground with reference to true north.

It will be seen that this is a very simple operation, requiring but a moment of time and absolutely no mental calculations on the part of the pilot. Therefore, by making a few trials, correcting the course of his ship each time, he may very quickly get on his proper course. Having once placed the ship in the correct position to take him over his true course, he observes his compass reading and follows that, simply using the indicator from time to time to check his course and make sure the wind has not changed.

A concrete example is graphically illustrated in Figure 3, and the instrument setting and adjustments necessary in obtaining a direct reading from these factors are indicated in Figure 2. Assuming the variation to be 10° W., the screws 23 are loosened, the ring 21 is shifted until the lubber line thereon coincides with the 10° W. graduation of the scale 26, and then the screws are tightened to fix the lubber line in this position. It will be assumed that the aviator desires to fly to a point 55° east of the starting point and is without knowledge of the wind direction or velocity. The ship would be turned until the reading is 55° on the ship's compass. Assuming that the magnetic deviation due to local attraction is 5° E., the deviation-card bearing ring is shifted until the graduation line on scale section 30 connected by a diagonal correction line with the 55° line on scale section 29 coincides with the lubber line. By adjusting the ground glass plate until the stream lines of projected images parallel the drift line, the drift angle is added to the true course, which in this instance is 50°. The resultant reading obtained by observation of the registration of the drift line with the scale section 29 of the deviation card is 160°. The track angle is thus read directly as 160°, so that pilot knows that his drift angle is 160°−50° (true course), or 110°. He therefore alters his course 110°.

The ground speed indicator will now be described. On the ground glass plate graduations 33 are inscribed along the drift line at right angles to the latter and at such distances from the center of the plate that they represent for various altitudes certain distances on the ground. Opposite each mark is placed the corresponding altitude. For a certain altitude and a certain distance on the ground, the distance from the corresponding mark on plate 16 to the center is determined by a simple proportion from the focal length of the lens. For instance, it may be convenient to graduate the ground speed scale so that the distance from each line to the center of the plate will represent one-half mile on the ground for the corresponding altitude.

Ground speed while in flight may be determined by using the indicator in the following way: The ground glass plate is turned until the drift line is parallel to the stream lines of images; the altitude is observed; and some distinct image is selected and timed in its passage from the center of the plate to the graduation line marked with the altitude at which the ship is flying. Assuming the altitude to be 8000 feet, the time of movement of the image between the center and the "8000" graduation is taken. If that be 15 seconds, the ship has flown one-half of a mile in 15 seconds, or at the rate of 120 miles per hour. The facility with which this result may be obtained should be obvious.

While my combined course and ground-speed indicator consists of certain essential elements, there are various modifications in the construction, such as substitution of equivalents, reversal of parts, etc., which may be resorted to in practice without departing from the scope of the appended claims.

I claim:

1. In a course indicator for aircraft, a support, an angularly adjustable member mounted on the support and having a direction indicating line adapted to be turned to a predetermined position with relation to the track of the craft over the ground, a scale of angular measurement graduated with reference to a true north bearing positioned so as to be traversed by the direction indicating line, a second scale to correct for magnetic deviation in any position of the craft in azimuth, and a movable lubber line to correct for magnetic variation, whereby the angular relation of the direction indicating line to a true north bearing may be determined.

2. In a course indicator for aircraft, a support, an angularly adjustable member mounted on the support and having a direction indicating line adapted to be turned parallel to the track of the craft over the ground, a scale of angular measurement graduated with reference to a true north bearing positioned so as to be traversed by the direction indicating line, a second scale of angular measurement, lines connecting some of the graduations of the second scale to some of the graduations of the first scale, the connected graduations of the second scale being offset angularly from the graduations of the first scale to which they are connected, by an amount equal to a magnetic deviation for that particular position of the craft on which it is used with respect to true north.

3. In a course indicator, a support and an angularly adjustable member mounted on the support and provided with an indicating line, a scale of measurement graduated with reference to a true north bearing mounted so as to be traversed by said indicating line, a second scale of angular measurement, lines connecting some of the graduations of the second scale to some of the graduations of the first scale, the connected graduations of the second scale being offset angularly from the graduations of the first scale to which they are connected, by an amount equal to the magnetic deviation for that particular position of the craft on which it is used with respect to true north, and a lubber line indicator provided on the support in registration with the second scale and being adjustable with reference to the axis of the craft.

4. A course indicator for aircraft comprising an angularly shaped supporting housing having a downwardly extending portion and a rearwardly extending portion, a lens in said downwardly extending portion, a rotatable screen in said forwardly extending portion, a reflecting means for reflecting an image of an object below on said screen, a reference line on said screen adapted to be moved to a position parallel to the path of movement of the image on the screen and adjustable means, concentric with the rotatable screen, having marking cooperating with the reference line, for compensating for magnetic deviation.

5. A course indicator for aircraft, comprising a translucent adjustable plate having a drift line inscribed thereon, means for throwing images of objects on the ground on said plate, an adjustable ring concentric with the plate calibrated for compensating for magnetic deviation due to iron in the aircraft, and an adjustable card having a lubber line thereon for compensating for compass deviation.

6. A course indicator for aircraft, comprising a translucent adjustable plate having a drift line inscribed thereon, means for throwing images of objects on the ground on said plate, and a card concentric with said plate and calibrated like a compass card with a lubber line thereon, adjustable for compensating for compass deviation.

7. A course indicator for aircraft, comprising direction indicating means adjustably mounted and adapted to be turned parallel to the track of the craft over the ground, and an independently adjustable element having a lubber line thereon, and having calibrations like those of a compass card cooperating with said direction indicating means.

8. A course indicator for aircraft, comprising direction indicating means adjustably mounted and adapted to be turned parallel to the track of the craft over the ground, an independently adjustable element having calibriations thereon for compensating for magnetic deviation due to iron in the aircraft, and a second independently adjustable element having a lubber line thereon and having calibrations like those of a compass card cooperating with said direction indicating means.

In testimony whereof I have affixed my signature.

ALONZO E. BELL.